United States Patent Office 3,813,351
Patented May 28, 1974

3,813,351
PRIMING COMPOSITION

J. Brent Thomson, Lewiston, Idaho, assignor to Hercules Incorporated, Wilmington, Del.
No Drawing. Continuation-in-part of application Ser. No. 167,799, July 30, 1971, now Patent No. 3,706,592, which is a division of application Ser. No. 862,531, Sept. 30, 1969, now Patent No. 3,697,551, which in turn is a continuation-in-part of abandoned application Ser. No. 789,974, Dec. 31, 1968. This application June 6, 1972, Ser. No. 260,079
Int. Cl. C08c *11/22, 11/24;* C08g *30/00*
U.S. Cl. 260—2 EP                    3 Claims

ABSTRACT OF THE DISCLOSURE

Disclosed are priming compositions comprising (1) a nitrogen containing silane compound of the formula

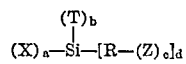

where R is an organic radical, X is selected from halo, hydroxy, alkoxy, aryloxy, organo oxycarbonyl, azido, amine, and amide radicals; T is selected from alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; and Z is selected from

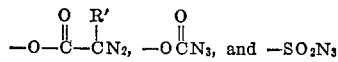

where R' is selected from hydrogen, alkyl, cycloalkyl, aryl and —COOR" radicals; where R" is selected from alkyl, cycloalkyl, and aryl radicals, (2) a polymer, and (3) a liquid medium. Also disclosed is a process to promote the adhesion of polymers to siliceous materials, metals, metal oxides, and other polymers using the said priming compositon.

This application is a continuation-in-part of my copending application Ser. No. 167,799, filed July 30, 1971, now U.S. Pat. No. 3,706,592 which is in turn a division of my copending application Ser. No. 862,531, filed Sept. 30, 1969, now U.S. Pat. No. 3,697,551 which in turn is a continuation-in-part of application Ser. No. 789,974, filed Dec. 31, 1968, now abandoned.

This invention relates to new priming compositions. In particular, this invention relates to priming compositions comprising (1) a nitrogen containing silane compound, (2) a polymer, and (3) a liquid medium.

It is known in the art to coat various substrates with polymers. However, in many cases the bond between the polymer and the substrate is weak. In still other cases, the adhesion is almost completely lost when the polymer coated article is subjected to moist conditions.

It has now been found that the adhesion of any polymer to siliceous materials, metals, metal oxides or other polymer substrates can be greatly improved by the treatment of the substrate with a priming composition comprising (1) a nitrogen containing silane compound having the general formula

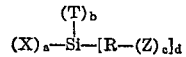

where R is an organic radical; X is selected from halo, hydroxy, alkoxy, aryloxy, organo oxycarbonyl, azido, amine, and amide radicals; T is selected from alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; and Z is selected from

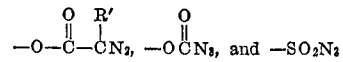

where R' is selected from hydrogen, alkyl, cycloalkyl, aryl, and —COOR" radicals; where R" is selected from alkyl, cycloalkyl and aryl radicals, (2) a polymer, and (3) a liquid medium. Not only does the treatment increase the adhesion of the polymer to the substrate, it also greatly improves wet strength retention.

In some cases priming with the composition of this invention may result in the production of the final product—e.g., in the protective coating of metal articles. In other cases the resulting primed article may only be an intermediate—e.g., where a primed plastic plate or sheet is to be laminated to another primed or unprimed plate or sheet.

Any polymer or mixture of polymers can be used in the priming composition of this invention. Exemplary of the polymers which can be so used are the hydrocarbon polymers including saturated, unsaturated, linear, atactic, crystalline or nonilinear amorphous polymers, copolymers, terpolymers, etc., as for example, polyethylene, polypropylene, poly(4-methylpentene - 1), polybutene-1, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc. and blends of these polymers with each other. In addition, nonhydrocarbon polymers including the cellulose esters such as cellulose acetate butyrate, acetate rayon, cellulose partial alkyl ethers such as hydroxyethyl and hydroxypropyl cellulose; viscose rayon; polyesters such as poly(ethylene terephthalate), drying and nondrying alkyd resins, etc.; poly(alkylene oxides) such as poly(ethylene oxide) and poly(propylene oxide), etc.; poly(arylene oxides) such as poly(phenylene oxide), etc.; the polyamides such as nylon, perlon-L, etc.; and poly(vinyl alkyl ethers) such as poly(vinyl methyl ether), etc.; vinyl chloride polymers containing at least 10 mole percent of vinyl chloride such as poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers such as the vinyl chloride-vinyl butyral copolymers, vinyl chloride-vinylidene chloride-acrylonitrile terpolymers, vinyl chloride-vinyl acetate-maleic anhydride terpolymers, etc.; chlorinated natural rubber; ethylene-vinyl acetate copolymers; poly(vinylidene chloride); vinylidene chloride-acrylonitrile copolymers; poly(ethyl acrylate); poly(ethyl methacrylate); polysulfone; epoxy resins; poly[3,3-bis(chloromethyl)oxtane]; polychloroprene; butadiene - acrylonitrilecopolymers; butadiene-acrylonitrile-styrene terpolymers; etc. can be used.

Any liquid medium in which the nitrogen containing silane compound and polymer can be either dissolved or dispersed can be used. The nitrogen containing silane compounds are generally soluble in organic solvents such as methylene chloride, ethylene dichloride, trichloroethylene, perchloroethylene, methanol, ethanol, isopropyl alcohol, acetone, methyl ethyl ketone, benzene, toluene, etc. The best solvent for the polymer will depend upon the specific polymer or polymers being used and can readily be determined by one skilled in the art. Dispersions can be prepared in water and also in some organic liquids, such as hexane, heptane, etc. It will be understood that in the case of dispersions, either the silane compound or the polymer may be soluble in the liquid medium.

The concentrations of the nitrogen containing silane compound and polymer in the compositions can vary over a wide range. In general, the primary composition will contain from about 0.01% to about 20.0%, more preferably from about 0.05% to about 5.0%, by weight of silane compound and from about 1.0% to about 75.0%, more preferably from about 5.0% to about 50.0%, by weight of polymer.

The materials or substrates which may be primed with the above compositions include siliceous materials such as glass, asbestos, sand, clay, concrete, stone, brick, ceramic materials, etc.; metals such as aluminum, cadmium, chromium, copper, magnesium, nickel, silver, tin, titanium, zinc, etc. and alloys of the metals such as brass, bronze, steel, nickel chrome, etc.; and including metals which have been surface treated with phosphates, chromates, etc.; metal oxides such as aluminum oxide, iron oxides, lead oxides, titanium dioxide, zinc oxide, etc.; and polymers, including the same polymer as in the composition or a different polymer. These materials which are to be primed can be in various forms such as sheets, plates, blocks, wires, cloth, fibers, particles, powders, etc. For example, in accordance with this invention the following articles can be primed: glass fibers, cord, plates, or cloth, asbestos sheets or fibers, siliceous fillers such as silicon dioxide (sand) or clay, metal sheets, plates or wires, metal oxide pigments, polymer sheets, woven fabric, fibers, etc.

The process of priming with the composition of this invention can be carried out in various ways. For example, the priming composition can be brushed, sprayed or spread over the surface of the material to be primed. Alternatively, the material or substrate can be dipped into the solution or dispersion. No matter which process of priming is used, it will be necesary to heat the primed article to initiate the bonding reaction through the azide or diazo group. The temperature at which bonding is effected can be varied over a wide range, depending upon the specific silane compound employed. In general, however, the temperature will be in the range of from about 70° C. to about 350° C.

In one modification of this invention, metal objects, such as metal cans can be primed, then heated, to form a tightly bonded, impervious coatng. It will be readily apparent to those skilled in the art that the priming compositions of this invention lend themselves to many occurrences where polymers are to be bonded to siliceous materials, metals, metal oxides or other polymers.

The nitrogen containing silane compounds used in this invention, as stated above, have the general formula

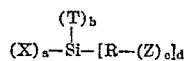

where X, T, R, Z, $a$, $b$, $c$, and $d$ are defined as above. Generally, R will be selected from the group consisting of the hydrocarbon, halo-substituted hydrocarbon, hydrocarbon-oxy-hydrocarbon, hydrocarbon-thio-hydrocarbon and hydrocarbon-sulfonyl-hydrocarbon divalent radicals. In preferred embodiments of this invention R will be a divalent organic radical selected from the group consisting of alkylene radicals such as the straight and branched $C_1$–$C_{20}$ alkylene radicals which include, for instance, the methylene, ethylene, trimethylene, tetramethylene, pentamethylene, hexamethylene, octamethylene, decamethylene, dodecamethylene, octadecamethylene, etc. radicals; cycloalkylene radicals such as the $C_3$–$C_{20}$ cycloalkylene radicals which include, for instance, the cyclohexylene, cyclopentylene, cyclooctylene, cyclobutylene, etc. radicals; arylene radicals such as o-, m-, and p-phenylene, naphthylene, biphenylene, etc. radicals; arylene-dialkylene radicals, such as o-, m-, and p-xylylene diethylene, o-, m-, and p-phenylene diethylene, etc. radicals; alkylenediarylene radicals such as methylene bis(o-, m- and p-phenylene), ethylene bis(o-, m-, and p-phenylene), etc. radicals; cycloalkylene-dialkylene radicals such as, 1,2-, 1,3- and 1,4-cyclohexane-dimethylene, 1,2- and 1,3-cyclopentane dimethylene, etc. radicals; and the alkylene-oxyalkylene radicals, arylene-oxy-arylene radicals, alkarylene - oxyarylene radicals, alkarylene - oxy - alkarylene radicals, aralkylene-oxy-alkylene radicals, aralkylene-oxyaralkylene radicals, etc. as well as the corresponding thio and sulfonyl radicals, specific examples of which include ethylene-oxy-ethylene, propylene - oxy - butylene, phenylene-oxy - phenylene, methylenephenylene - oxy - phenylenemethylene, phenylenemethylene - oxy - methylenephenylene, ethylene-thio-ethylene, phenyl-thio-phenylene, phenylenemethylene-thio - methylenephenylene, butylenesulfonyl-butylene, etc. radicals. It will, of course, be obvious to those skilled in the art that R can contain other functional groups, which are substantially inert to the reactions in which these compounds are used, such as esters, sulfonate esters, amides, sulfonamides, urethanes, and the like. In general R' can be hydrogen, alkyl, cycloalkyl, aryl or —COOR'' radicals. The most preferred alkyl, cycloalkyl and aryl radicals are methyl, ethyl, propyl, butyl, isobutyl, cyclohexyl, cycloheptyl, phenyl, tolyl, etc. The radical R'' can be alkyl, cycloalkyl, or aryl with the most preferred radicals being methyl, ethyl, propyl, butyl, isobutyl, cyclohexyl, cycloheptyl, phenyl, tolyl, etc. In general, X can be hydroxy or any hydrolyzable radical. Typical hydrolyzable radicals are the halo radicals which include, for instance, the fluoro, chloro, bromo and iodo radicals; the alkoxy radicals including the $C_1$–$C_{20}$ straight and branched chain alkoxy radicals such as methoxy, ethoxy, propoxy, butoxy, isobutoxy, octadecyloxy, etc.; the aryloxy radicals such as phenoxy, etc.; the organo oxycarbonyl radicals including the aliphatic oxycarbonyl radicals such as acetoxy, propionyloxy, stearoyloxy, etc.; the cycloaliphatic oxycarbonyl radicals such as cyclohexylcarbonyloxy, etc.; the aromatic oxycarbonyl radicals such as benzoyloxy, xylyloxy, etc.; the azido radical; the amine radical; the substituted amine radicals such as ethylamine, diethylamine, propylamine, etc.; and the amide radicals such as formamide, acetamide, trifluoroacetamide, benzamide, etc. Generally, T will be a radical selected from the group consisting of alkyl, cycloalkyl, aryl, alkaryl, and aralkyl radicals such as methyl, ethyl, propyl, isopropyl, butyl, hexyl, cyclohexyl, cycloheptyl, phenyl, tolyl, benzyl, xylyl, etc.

Typical nitrogen containing silane compounds of this invention are 3-(trimethoxysilyl)propyl diazoacetate,
2-(methyldichlorosilyl)ethyl diazoacetate,
p-(trimethoxysilyl)benzyl diazoacetate,
10-[(3-trimethoxysilylpropyl)carbamoyl]decyl diazoacetate,
4-(trimethoxysilyl)butyl α-diazopropionate,
3-(ethyldimethoxysilyl)propyl α-diazo-α-phenylacetate,
3-(trichlorosilyl)propyl α-diazo-α-carbomethoxyacetate,
2-(trimethoxysiyly)ethyl α-diazo-α-carbophenoxyacetate,
4-(ethoxydichlorosilyl)cyclohexyl diazoacetate,
3-(trimethoxysilyl)propyl azidoformate,
3-(methyldimethoxysilyl)propyl azidoformate,
2-chloro-3-[3-trimethoxysilyl)propoxy]propyl azidoformate,
3-(triazidosiyly)propyl azidoformate,
2-(trimethoxysilyl)ethyl azidoformate,
3-(triacetoxysilyl)propyl azidoformate,
2-[3-(trimethoxysilyl)propoxy]ethyl azidoformate,
3-(methyldiacetosilyl)propyl azidoformate,
2-(ethyldipropionyloxysilyl)ethyl azidoformate,
p-(trimethoxysilyl)phenyl azidoformate,
4-(diethoxychlorosilyl)butyl azidoformate,
4-(ethyldimethoxysilyl)cyclohexyl azidoformate,
3-(phenyldichlorosilyl)propyl azidoformate,
4-(trisdimethylaminosilyl)butyl azidoformate,
5-(trimethoxysilyl)amylsulfonyl azide,
4-(trimethoxysilyl)cyclohexylsulfonyl azide,
2-methyl-4-(trichlorosilyl)butylsulfonyl azide,
3-chloro-6-(trimethoxysilyl)hexylsulfonyl azide, 6-(trimethoxysilyl)hexylsulfonyl azide,
2-(trichlorosilyl)ethylsulfonyl azide,
3-(dimethylaminodimethylsilyl)propylsulfonyl azide,
2-(triethoxysilyl)ethylsulfonyl azide,
3-(methyldimethoxysilyl)propylsulfonyl azide,
3-(trimethoxysilyl)propylsulfonyl azide,
4-[diethoxy-(4-sulfonylazidobutyl)silyl]butylsulfonyl azide,
p-(trimethoxysilyl)benzenesulfonyl azide,
2-(trimethoxysilyl)ethylbenzenesulfonyl azide,
N-3-(triethoxysilyl)propyl-N'-3-azidosulfonylpropyl-urea,
N-3-(triethoxysilyl)propyl-N'-m-azidosulfonylphenyl-urea, etc.

The nitrogen containing silane compounds used in this invention can be prepared by various methods such as shown in my copending parent application Ser. No. 862,531, filed Sept. 30, 1969.

Many of the nitrogen containing silane compounds used in this invention are liquids, that is liquid at 20–25° C., and at atmospheric pressure. However, some are solids. They are characterized in that the diazo or azido portion readily reacts with a wide variety of polymers to effect linkage of the polymer to the silane compound. They are further characterized in that the silane portion of the molecule adheres to materials such as siliceous materials, metals, metal oxides and many polymers.

The above described nitrogen containing silane compounds readily condense to form dimers, trimers and even polymers when heated and/or in the presence of water and acidic or basic condensation catalysts. Because of the ease with which they condense, it is apparent that many of the silane compounds used in this invention (with the exception of those freshly prepared under anhydrous conditions) exist in admixture with at least a small amount of their condensation products. Therefore, it is to be understood that the terms "nitrogen containing silane compound" and "silane compound," used in the specification and claims of this application, include not only the pure monomeric compounds but also mixtures of the monomers with at least a small amount of the condensation products of the monomers. It may be desirable in some cases to use a condensation product of a nitrogen containing silane compound instead of the monomer. If this is desired such condensation product can readily be prepared by heating one of the above described silane compounds in the presence of a small amount of water and a conventional condensation catalyst, i.e., acetic acid, HCl, HBr, NaOH, NH$_4$OH, or the like. A typical dimer would have the general formula

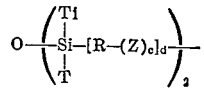

where T, R, Z, c and d are as defined above. A typical condensation polymer would have the general formula

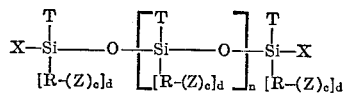

where X, T, R, Z, c and d are as defined above.

The following examples will illustrate the invention, all parts and percentages being by weight unless otherwise indicated.

EXAMPLE 1

This example illustrates the priming of a steel panel with an azidosilane, polypropylene and liquid medium.

A colloidal suspension of approximately 20–22% total solids crystalline polypropylene particles, having an average particle size within the range of 0.02–0.5 micron, in a mixed aliphatic hydrocarbon solvent, having a boiling point of 165° C. to 200° C., was divided into four portions. To each portion of the colloidal suspension was added a different amount of 2-chloro-3-[3-(trimethoxysilyl)propoxy]propyl azidoformate in a methylene chloride solution. Each suspension was mechanically mixed and then used to dip-coat an iron phosphate treated steel panel. Each coated panel was baked at a temperature of 400° F. for eight minutes and then allowed to cool. The coating on each panel was tested for adherence by scoring with a razor blade and then drawing the edge of a metal coin firmly across the thus scored surface. The adhesion of the coating to the surface was rated as follows:

Poor—the coating strips easily from the substrate
Fair—a major part of the coating is removed but very noticeable resistance to the coin is noted
Good—a minor part of the coating is removed. The coin skips across the coating rather than removing a continuous film.
Excellent—None of the coating is removed.

The results of the test are tabulated below:

| Sample: | Percent of azidosilane in suspension [1] | Adhesion |
|---|---|---|
| a | None (control) | Poor. |
| b | 0.1 | Good. |
| c | 0.5 | Excellent. |
| d | 1.0 | Do. |

[1] Percent by weight based on the weight of polypropylene.

EXAMPLE 2

This example shows the bonding of a polypropylene suspension to metal panels and lap shear bond strength tests where the polypropylene is first mixed with an azidosilane compound.

Samples of the colloidal suspension of crystalline polypropylene particles described in Example 1 were mixed with various amounts of azidosilane in methylene chloride solution.

Metal panels 1 x 4 inches and 1/16 inch thick were cleaned and then degreased in trichloroethylene vapor. Each panel was coated on one side, using a 10 mil drawdown knife, with the priming composition. The coatings were fused at 190–200° C. for 7 minutes. Plaques (40 mils thick) of crystalline polypropylene film having a specific gravity of 0.904 g./cc. and a melt index (I$_2$ at 230° C.) of 4 were placed between the primed metal panels so that the panels overlapped approximately ½ inch. Each assembly was molded in a hydraulic press at a temperature of 230° C. for 5 minutes. The time was used as follows: 3 minutes at contact pressure, 1 minute up to a pressure of 200 p.s.i., and 1 minute at pressure. The molded samples were tested for lap shear strength. The metal panels used, the azidosilane compound used and the amount and the results of the test are tabulated below:

| Azidosilane | Amount, percent [1] | Metal panel | Lap shear bond strength, p.s.i. |
|---|---|---|---|
| 3-(trimethoxysilyl) propyl azidoformate. | 0.5 | Aluminum | 1,030 |
| Do | 1.0 | do | 2,000 |
| Do | 2.0 | do | 2,500 |
| Do | 1.0 | Cold rolled steel | 760 |
| Do | 2.0 | do | 1,300 |
| Sulfonyl azide [2] | 0.5 | Aluminum | 1,170 |
| Do | 1.0 | do | 1,650 |
| Do | 2.0 | do | 2,140 |
| Do | 1.0 | Cold rolled steel | 720 |
| Do | 2.0 | do | 2,250 |

[1] Percentage by weight based on the weight of polypropylene.
[2] Mixed isomers of (trimethoxysilyl)hexylsulfonyl azide.

EXAMPLE 3

This example shows the bonding of a mixture of polypropylene and poly(vinyl acetate) to samples of glass cloth by treating the said cloth with an aqueous priming system containing an azidosilane and a dispersion of the polymers.

Strips of 181 style electrical glass cloth, heat cleaned and having a weight of 8.9 ounces per square yard, were immersed in an aqueous dispersion prepared as follows: To 200 parts of water containing a small amount of alkylphenoxy poly(ethyleneoxy ethanol) nonionic surfactant was added with vigorous agitation 10 parts (based on the solids) of an aqueous dispersion of poly(vinyl acetate) having a Brookfield viscosity of 10 poises at 25° C. and a pH of 5.0. Then 10 parts of crystalline polypropylene particles, having an average particle size within the range of 0.02-0.5 micron, and 1 part of mixed isomers of (trimethoxysilyl)hexylsulfonyl azide were added with continued agitation. After immersion, the strips were hung up to dry and then cut into 5¾ inch squares for lamination. Twelve squares of the sized sheet were alternately laid up with 5 mil sheets of crystalline polypropylene and compression molded at a temperature of 220° C. for 7 minutes at contact pressure, 3 minutes at a pressure of 440 p.s.i. and then cooled to 23° C. under 440 p.s.i. pressure. Test specimens were cut from the laminates and tested for flexural strength and modulus according to ASTM D-790. Tests were also conducted on the samples after boiling in water for 72 hours. The results of the tests are tabulated below.

|  | Grams of azidosilane in sizing dispersion | Dry flexural properties | | 72 hour boil flexural properties | | Percent strength retention |
|---|---|---|---|---|---|---|
|  |  | Strength, p.s.i. | Modulus, p.s.i.×10⁶ | Strength, p.s.i. | Modulus, p.s.i.×10⁶ |  |
| Sample: |  |  |  |  |  |  |
| a | 0.125 | 35,800 | 2.2 | 23,900 | 1.9 | 66 |
| b | 0.25 | 27,800 | 1.8 | 21,500 | 1.9 | 77 |
| c | 0.50 | 37,700 | 1.9 | 26,100 | 1.9 | 69 |

EXAMPLE 4

This example shows the bonding of polypropylene to samples of glass cloth which have first been primed with a diazosilane priming composition.

Twelve strips of the glass cloth described in Example 3 were immersed in a dispersion prepared as follows: To 100 parts of a methylene chloride solution of 10-[3-(trimethoxysilylpropyl)-carbamoyl] decyl diazoacetate was added 5 parts of crystalline polypropylene particles, having an average particle size within the range of 0.02-0.5 micron, with agitation. After immersion, the strips were hung up to dry and then laid up to form a laminate by alternating plies of the primed glass cloth with twelve sheets of 5 mil crystalline polypropylene film. The resulting assembly was compression molded at a temperature of 220° C. for 7 minutes at contact pressure, 3 minutes at a pressure of 440 p.s.i., and then cooled to 23° C. under 440 p.s.i. pressure to form a laminate about ⅛ inch thick. Test specimens 1 inch by 3 inches were cut from the laminates and tested for flexural strength and flexural modulus according to ASTM D-790 on a 2 inch span at 0.05 inch/minute crosshead speed. Tests were also conducted on samples after boiling in water. The results of the tests are tabulated below.

|  | Diazoacetate silane con. (wt. percent in CH₂Cl₂) | Dry flexural properties | | 72 hour boil flexural properries | | Percent strength retention |
|---|---|---|---|---|---|---|
|  |  | Strength, p.s.i. | Modulus, p.s.i.×10⁶ | Strength, p.s.i. | Modulus, p.s.i.×10⁶ |  |
| Sample: |  |  |  |  |  |  |
| a | 0.250 | 34,500 | 2.1 | 24,200 | 2.1 | 70.5 |
| b | 0.125 | 34,100 | 2.1 | 28,000 | 2.2 | 82.2 |
| Control | None | 12,500 | 1.8 | 8,100 | 1.4 | 64.7 |

EXAMPLE 5

This example shows the use of an azidosilane compound to prime glass rovings.

An aqueous solution of 0.5% by weight 2-(trimethoxysilyl)ethylbenzenesulfonyl azide and 0.25% by weight water-soluble epoxy resin, having an epoxide equivalent weight of 117, was applied to continuous rovings of electrical glass fibers as they were formed at the glass drawing bushing. The thus primed rovings were taken up on a spool, baked for 40 minutes at a temperature of 100° C., and then chopped into ¼ inch lengths. The chopped rovings were blended with crystalline polypropylene, having a melt index (I₂ at 230° C.) of 149, to provide a glass level of 30% by weight. The mixture was fed into a reciprocating screw injection molding machine maintained at 440° F. in zone 1, 460° F. in zone 2, 470° F. at the nozzle and the mold heated to 120° F. The ½ by ⅛ by 5 inch specimens were tested and found to have a flexural strength of 15,000 p.s.i. Control specimens, not treated with the azidosilane compound had a flexural strength of 9,000 p.s.i. In addition to the difference in strength the treated rovings were much easier to handle in that they maintained their integrity to a much greater extent than the untreated rovings.

What I claim and desire to protect by Letters Patent is:
1. A priming composition comprising
   (1) a nitrogen containing silane compound having the formula

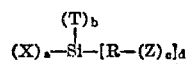

where R is an organic radical; X is a radical selected from the group consisting of halo, hydroxy, alkoxy, aryloxy, organo oxycarbonyl, azido, amine and amide radicals; T is a radical selected from the group consisting of alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; and Z is a radical selected from the group consisting of

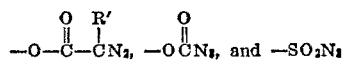

where R' is a radical selected from the group consisting of hydrogen, alkyl, cycloalkyl, aryl and —COOR" radicals; where R" is a radical selected from the group consisting of alkyl, cycloalkyl and aryl radicals,
   (2) a polymer selected from the group consisting of saturated and unsaturated hydrocarbon polymers, cellulose esters, cellulose partial alkyl ethers, viscose rayon, polyesters, poly(alkylene oxides), poly(arylene oxides), polyamides, poly(vinyl alkyl ethers), vinyl chloride homopolymers and copolymers, chlorinated natural rubber, ethylene—vinyl acetate copolymers, poly(vinylidene chloride), vinylidene chloride—acrylonitrile copolymers, poly(ethyl acrylate), poly(ethyl methacrylate), polysulfone, epoxy resins, poly[3,3 - bis(chloromethyl)oxetane], polychloroprene, butadiene—acrylonitrile copolymers, and butadiene—acrylonitrile—styrene terpolymers, and (3) a liquid medium.

2. The composition of claim 1 where the liquid medium is water.

3. The composition of claim 1 where the liquid medium is an organic solvent.

References Cited

UNITED STATES PATENTS

| | | | |
|---|---|---|---|
| 2,927,839 | 3/1960 | Bailey et al. | 8—8 |
| 2,998,406 | 8/1961 | Bailey et al. | 8—8 |
| 3,418,094 | 12/1968 | Marsden | 260—29.2 N |
| 3,449,293 | 6/1969 | Burzynski et al. | 260—29.2 N |
| 3,558,669 | 1/1971 | Breslow | 260—349 |
| 3,616,199 | 10/1971 | Breslow | 260—349 |

MURRAY TILLMAN, Primary Examiner

J. ZIEGLER, Assistant Examiner

U.S. Cl. X.R.

117—76 T, 100 S, 121, 124 F, 126 GS, GN, 132 BS, 135.1, 138.8 E, F; 260—2 A, 9, 13, 29.2 N, 29.6 MN, 29.7 N, 32.8 N, 334 R, EP, 33.6 A, EP, UA, 33.8 EP, UA, 47 ET, 75 N, 78 R, 79, 82.3, 85.5 R, 89.3, 91.1 R, 92.8 R, 141, 349, 448, 2 BN, 735, 878 R, 824, 827